(12) United States Patent
Kawasaki et al.

(10) Patent No.: US 7,812,819 B2
(45) Date of Patent: Oct. 12, 2010

(54) INFORMATION PROCESSING APPARATUS AND INFORMATION PROCESSING METHOD

(75) Inventors: Katsuhiko Kawasaki, Kawasaki (JP); Kenichiro Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 796 days.

(21) Appl. No.: 11/744,692

(22) Filed: May 4, 2007

(65) Prior Publication Data
US 2007/0290994 A1    Dec. 20, 2007

(30) Foreign Application Priority Data
Jun. 16, 2006    (JP)    ............................. 2006-167431

(51) Int. Cl.
G06F 3/033    (2006.01)
G09G 5/08    (2006.01)

(52) U.S. Cl. ..................... 345/157; 345/158; 345/159; 345/684

(58) Field of Classification Search ......... 345/156–184, 345/684–689
See application file for complete search history.

(56) References Cited

U.S. PATENT DOCUMENTS

| 6,278,443 | B1 * | 8/2001 | Amro et al. ................. 345/173 |
| 6,297,836 | B1 * | 10/2001 | Kurashina ................... 345/684 |
| 7,239,964 | B2 * | 7/2007 | Takizawa .................... 701/211 |
| 7,505,031 | B2 * | 3/2009 | Nagasaka ................... 345/156 |
| 2002/0123368 | A1 | 9/2002 | Yamadera et al. |
| 2003/0231164 | A1 * | 12/2003 | Blumer et al. .............. 345/159 |

FOREIGN PATENT DOCUMENTS

| JP | 5094131 A | 4/1993 |
| JP | 7280577 A | 10/1995 |
| JP | 2002261918 A | 9/2002 |

* cited by examiner

*Primary Examiner*—David L Lewis
(74) *Attorney, Agent, or Firm*—Canon USA Inc IP Division

(57) ABSTRACT

An information processing apparatus includes a first display control unit configured to display information on a display screen, a detection unit configured to detect the operation direction and an operation amount of a direction inputting operation, a scroll control unit configured to scroll the information displayed on the display screen in the operation direction detected by the detection unit, and a second display control unit configured to control the display of information so that the higher the operation amount detected by the detection unit, the wider a display area becomes in the operation direction detected by the detection unit.

5 Claims, 24 Drawing Sheets

FIG. 10

FIG. 23
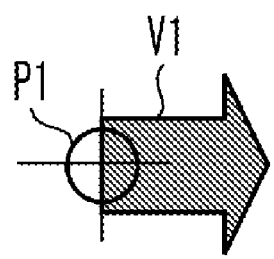
GYOSEI ELEMENTARY SCHOOL
1
(J1)
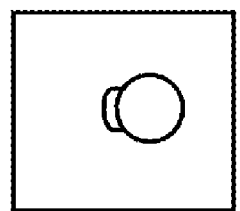
4

FIG. 24
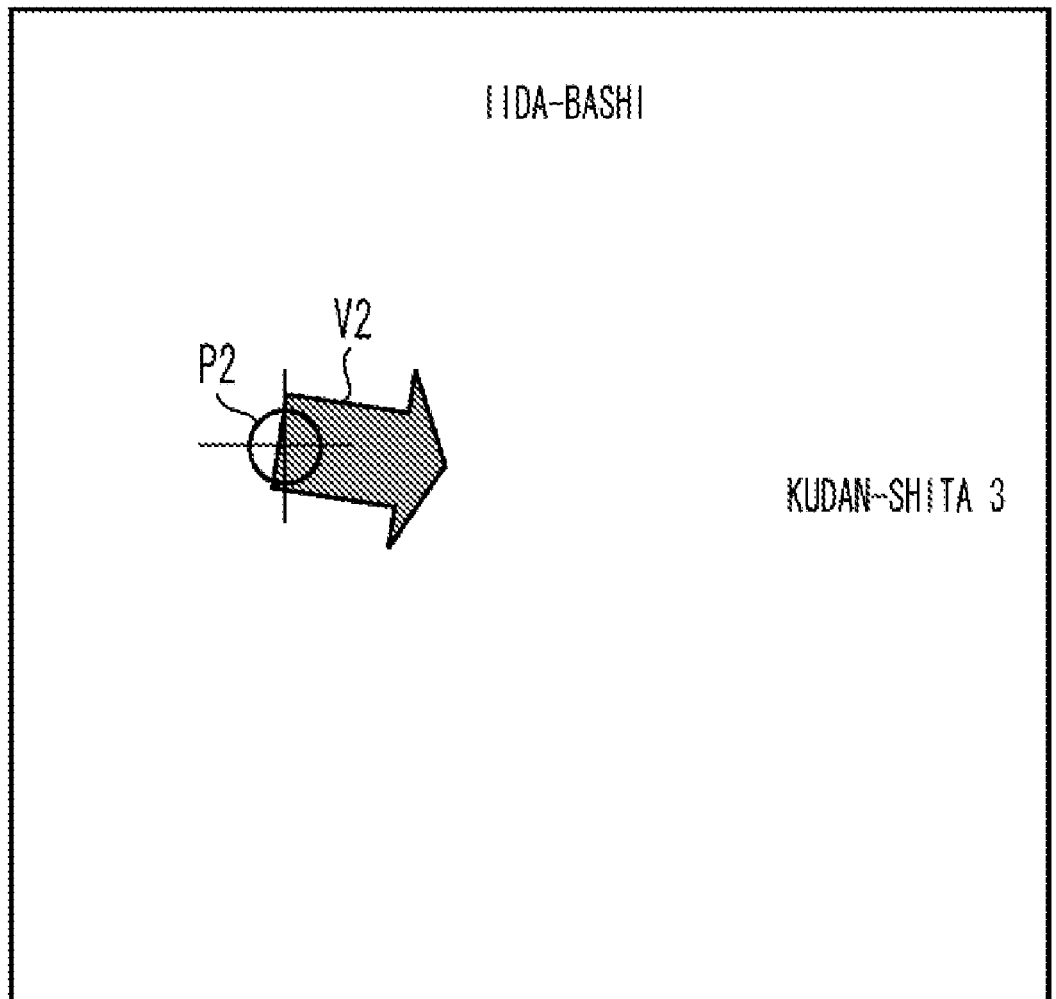
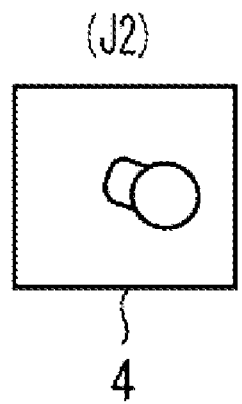

US 7,812,819 B2

INFORMATION PROCESSING APPARATUS AND INFORMATION PROCESSING METHOD

BACKGROUND OF THE INVENTION

1. Field of the Invention

The present invention relates to an information processing apparatus for processing a selected item which is displayed on a display screen.

2. Description of the Related Art

Various researches have been conducted to intelligibly present an item to be displayed on a screen to a user.

For example, Japanese Patent Application Laid-Open No. 2002-261918 discusses a technique for magnifying and displaying a focused icon, in which icons except the focused icon are moved to magnify the focused icon. Further, this reference also discusses a technique in which icons except the focused icon is reduced and moved to expand a display area of the focused icon.

Japanese Patent Application Laid-Open No. 5-094131 discusses a navigation device for a moving object, which expands the display area in an advancing direction of a moving object.

Japanese Patent Application Laid-Open No. 7-280577 discusses a technique for monitoring the continuous operation time of a scroll key for determining a scrolling direction in a map. When the operation time exceeds threshold values, a scale of a map is automatically and stepwise changed to display a larger area and scrolling is continued in the determined direction.

The technique discussed in Japanese Patent Application Laid-Open No. 2002-261918 does not provide a user with sufficient visibility in the direction selected by the user. In the technique discussed in Japanese Patent Application Laid-Open No. 5-094131, the display area of a map is restricted by the location of a moving object, so that a user cannot freely select the display area and a scrolling speed in a map. In addition, although the display area is expanded in an advancing direction of a moving object, the advancing speed of the moving object is not considered. In the technique discussed in Japanese Patent Application Laid-Open No. 7-280577, a cursor is not smoothly moved according to changing of a map scale and scrolling, so that a user cannot select an arbitrary point on the map with the cursor.

SUMMARY OF THE INVENTION

According to an aspect of the present invention, an information processing apparatus includes a first display control unit configured to display information on a display screen, a detection unit configured to detect the operation direction and an operation amount of a direction inputting operation, a scroll control unit configured to scroll the information displayed on the display screen in the operation direction detected by the detection unit, and a second display control unit configured to control the display of information so that the higher the operation amount detected by the detection unit becomes, the wider a display area becomes in the operation direction detected by the detection unit.

According to another aspect of the present invention, an information processing apparatus includes a display control unit configured to display information on a display screen, a cursor display control unit configured to display a cursor on the information, a detection unit configured to detect the operation direction and the operation amount of a direction inputting operation, a scroll control unit configured to scroll the information displayed on the display screen in the operation direction detected by the detection unit, and a first cursor movement control unit configured to move the cursor in a direction contrary to the direction detected by the detection unit when the operation amount detected by the detection unit exceeds a predetermined value.

According to yet another aspect of the present invention, a method for processing information includes displaying information on a display screen, detecting the operation direction and the operation amount of a direction inputting operation, scrolling the information displayed on the display screen in the detected operation direction, and controlling the display of information so that the larger the detected operation amount becomes, the wider a display area becomes in the detected operation direction.

According to another aspect of the present invention, a method for processing information includes displaying information on a display screen, displaying a cursor on the information, detecting the operation direction and the operation amount of a direction inputting operation, scrolling the information displayed on the display screen in the detected operation direction, and moving the cursor in a direction contrary to the direction detected by the detection unit when the detected operation amount exceeds a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

Figure 10:
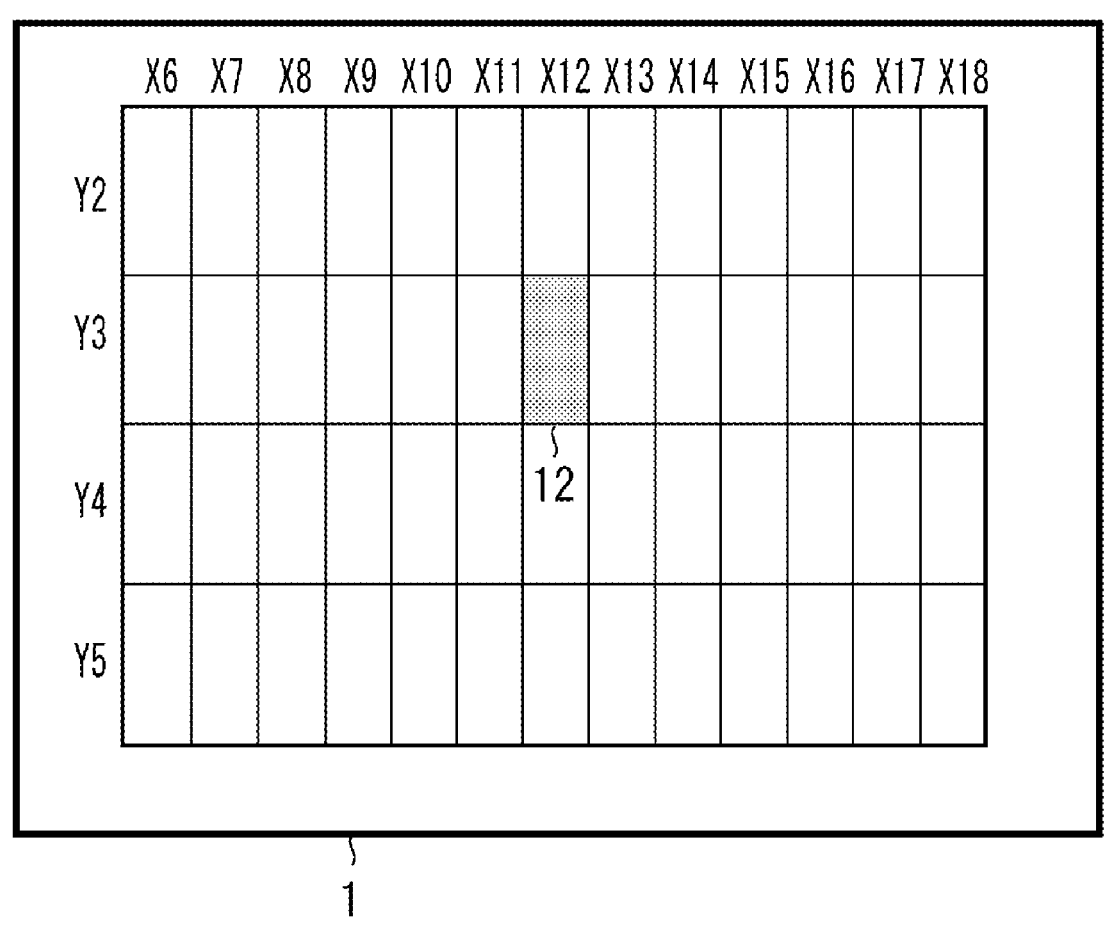

FIG. 10 illustrates an item and a cursor displayed in a display unit.

FIG. 23 illustrates a map of a display area, a cursor, and a vector showing a cursor moving speed.

FIG. 24 illustrates a map of a display area, a cursor, and a vector showing a cursor moving speed.

DETAILED DESCRIPTION OF THE EMBODIMENTS

Various exemplary embodiments, features, and aspects of the invention will be described in detail below with reference to the drawings.

Figure 1:
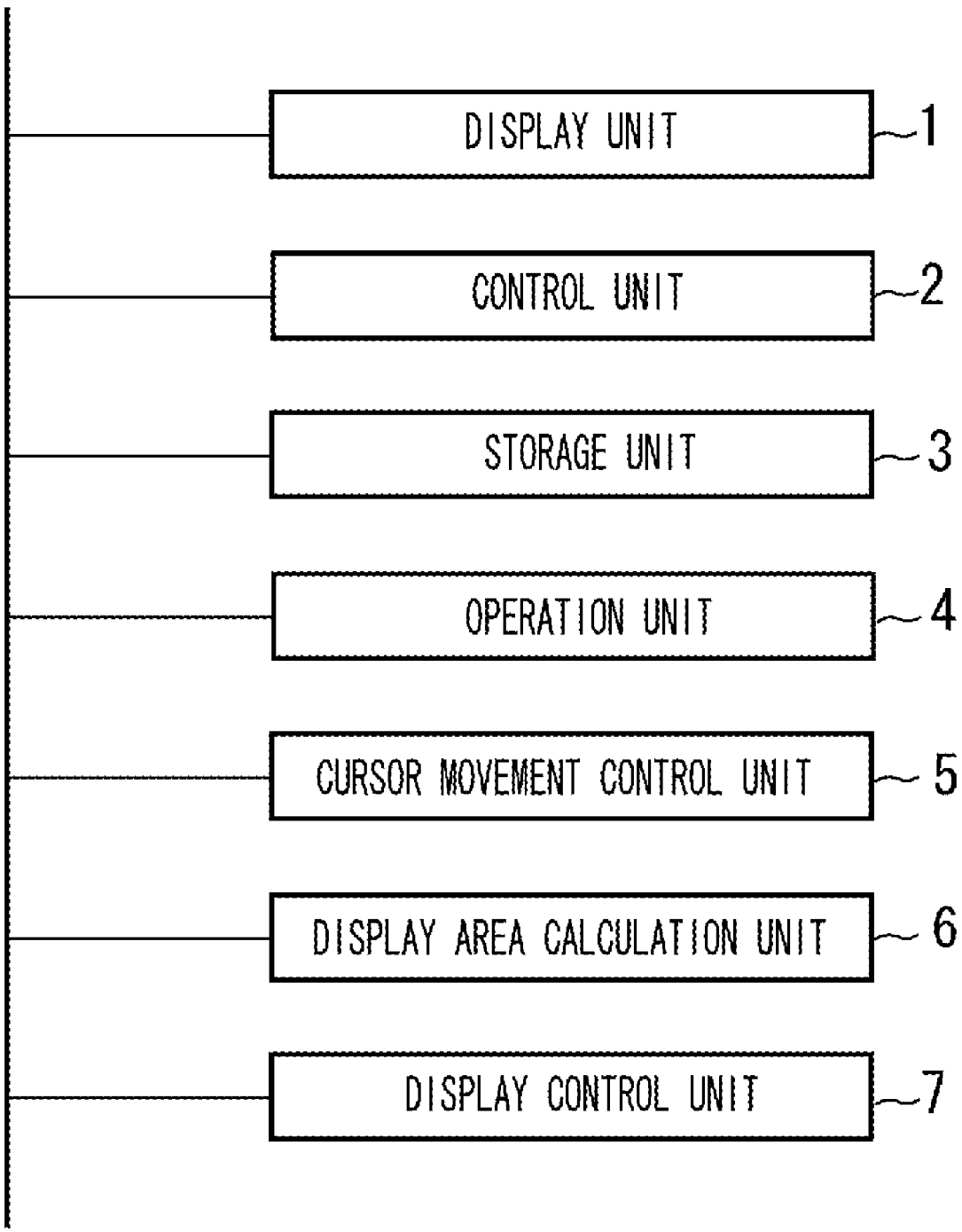
FIG. 1 is a view of a display selection apparatus according to the first embodiment of the present invention.

As an example of an information processing apparatus according to a first embodiment of the present invention, a display selection device for selecting an arbitrary item from a plurality of displayed items will be described. FIG. 1 illustrates the display selection device. The display selection device includes a display unit 1, a control unit 2, a storage unit 3, an operation unit 4, a cursor movement control unit 5, a display area calculation unit 6, and a display control unit 7.

The display unit 1 displays items to be selected. The control unit 2 controls the whole processing. The storage unit 3 stores information required for the processing, and information of a selected item. The operation unit 4 includes an arrow key and a set key. The operation unit 4 can be provided in the display selection device, or can be separated as a remote controller. When the operation unit 4 is separated, the display selection device includes a reception unit (not illustrated) configured to receive an instruction from the separated operation unit 4. The cursor movement control unit 5 controls the movement of a cursor according to the operation of the arrow key in the operation unit 4. The display area calculation unit 6 changes a display area according to the operation of the arrow key in the operation unit 4. The display control unit 7 controls an item and a cursor in the display area calculated by the display area calculation unit 6 so as to display those on the display unit 1.

Figure 2:
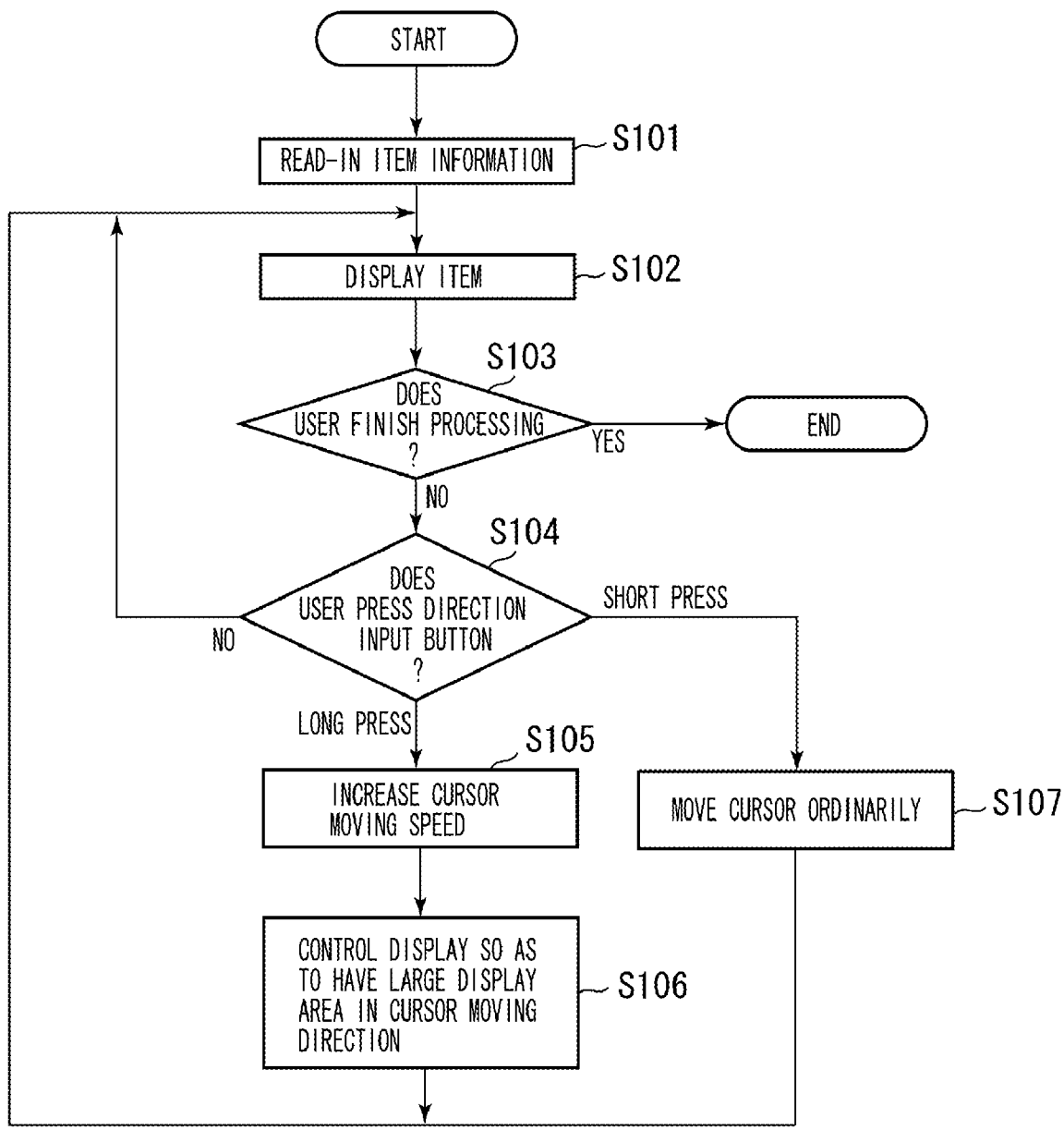
FIG. 2 is a flowchart illustrating processing of a display selection device according to the first embodiment.

Next, processing in the display selection device of this embodiment will be described referring to the flowchart of FIG. 2. A program for carrying on the flowchart is stored in the storage unit 3 and executed under control of the control unit 2.

Figure 3:
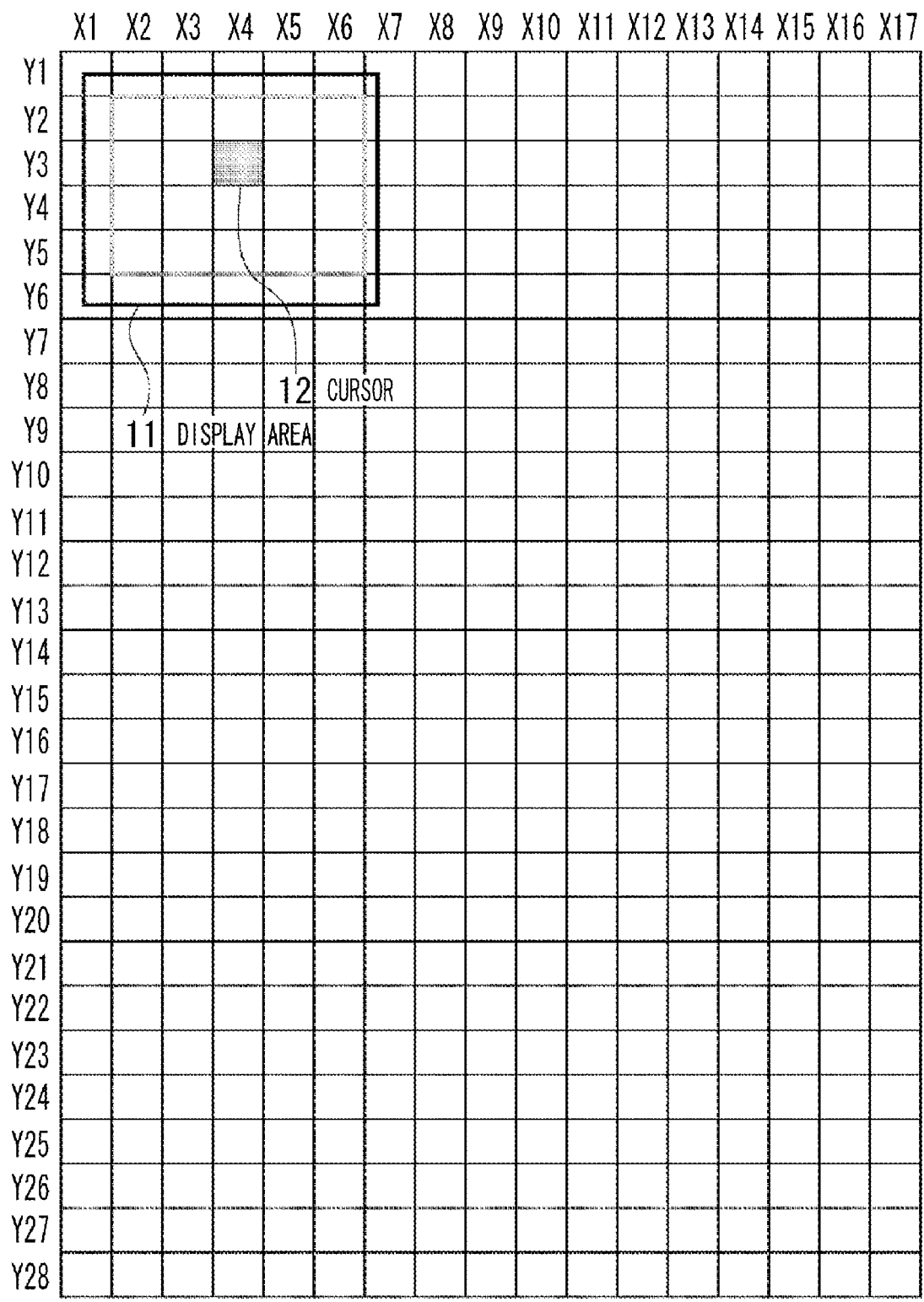
FIG. 3 illustrates a display area in an item space and a position of a cursor.

The apparatus reads in information of items which is stored in the storage unit 3 and arranged in a matrix state illustrated in FIG. 3 in step S101. For example, when the items in a matrix state are an electronic program guide, X1, X2, X3 . . . indicate channel numbers, and Y1, Y2, Y3 . . . indicate a broadcasting time zone. Further, when the items are spreadsheet software, the items correspond to each cell.

Figure 4:
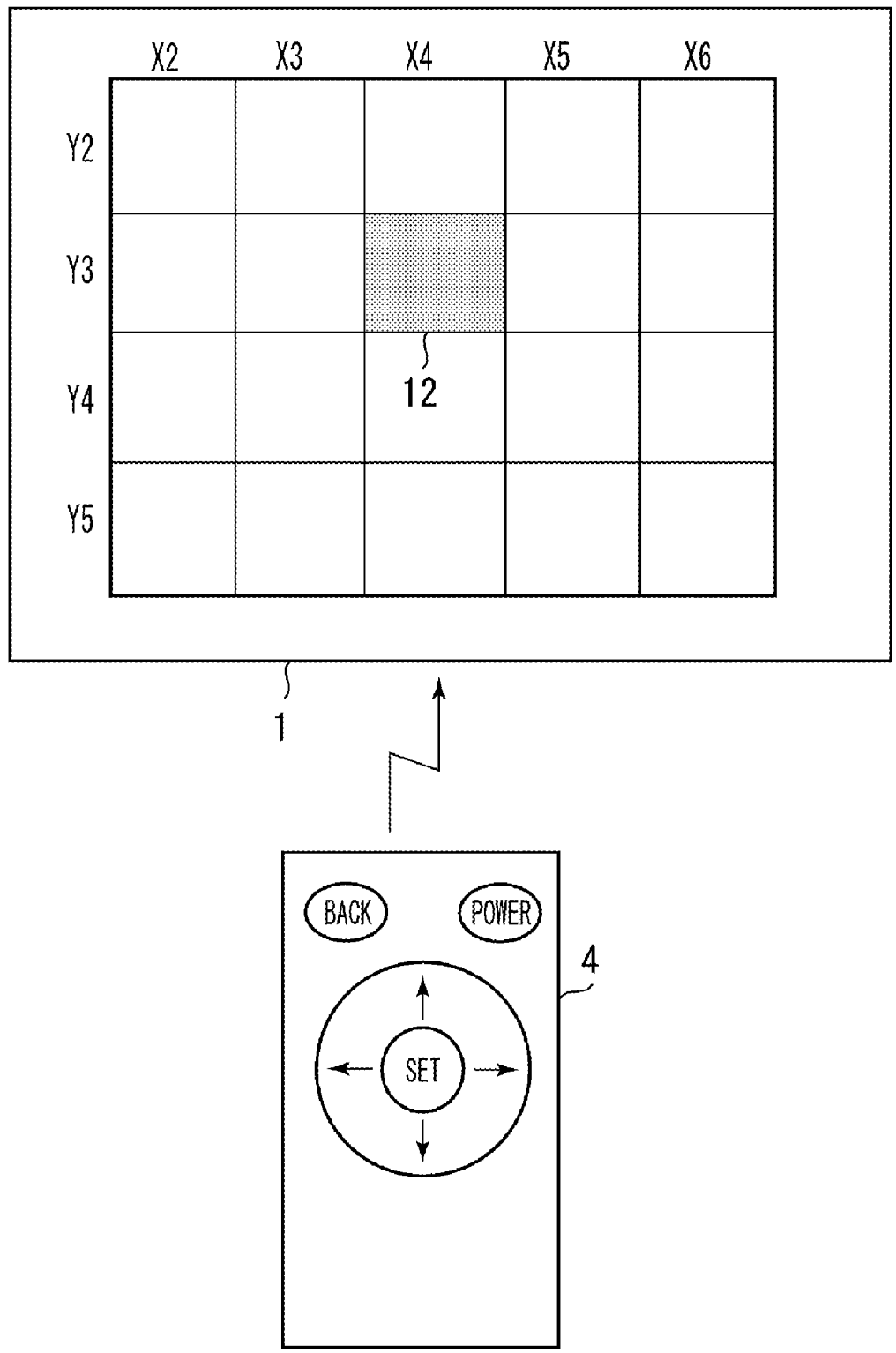
FIG. 4 illustrates an item and a cursor displayed in a display unit, and a remote controller of an operation unit.

The display unit 1 displays the items read in step S101 under control of the display control unit 7. In this case, a display area 11 around a cursor 12 in FIG. 3 is displayed. The display unit 1 displays the matrix state of the items in the proportion of vertical 4×horizontal 5 as illustrated in FIG. 4. The cursor position is placed at the coordinate (X3, Y4) in FIG. 3.

FIG. 4 also illustrates the remote controller described as an example of the operation unit 4. The operation unit 4 can be either separated or provided in the information processing apparatus. The remote controller includes at least four buttons of ↑, ↓, ←, and → (direction input buttons) for vertically and horizontally moving the cursor. In this apparatus, the buttons of ↑, ↓, ←, and → can identify a short press and a long press, and detect pressing time. A user's operation of pressing a button and inputting a direction is referred to as a direction input operation in this embodiment.

When the user selects to finish the processing in step S103 (YES in step S103), the processing is ended. When the user continues the processing in step S103 (NO in step S103), the processing proceeds to step S104. When the user long-presses any buttons of ↑, ↓, ←, and → (LONG PRESS in step S104), the moving speed of the cursor is obtained in step S105. In step S105, the longer the pressing time of the button, that is, the larger the operation amount, the higher the moving speed of the cursor. In order to obtain the moving speed, various methods are available, for example, the speed can be stepwise increased or an upper limit can be set.

Figure 5:
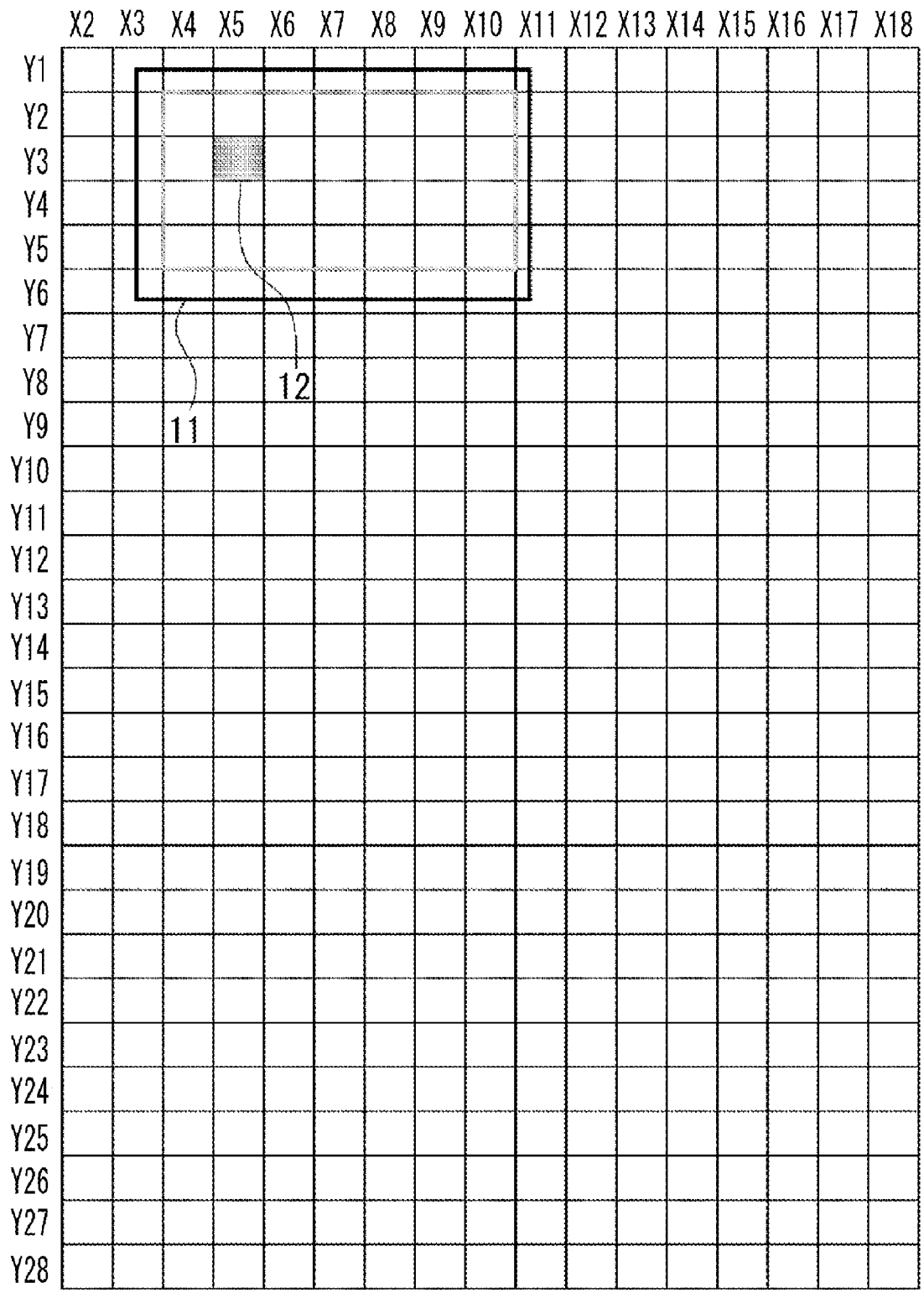
FIG. 5 illustrates a display area in an item space and a position of a cursor.
Figure 6:
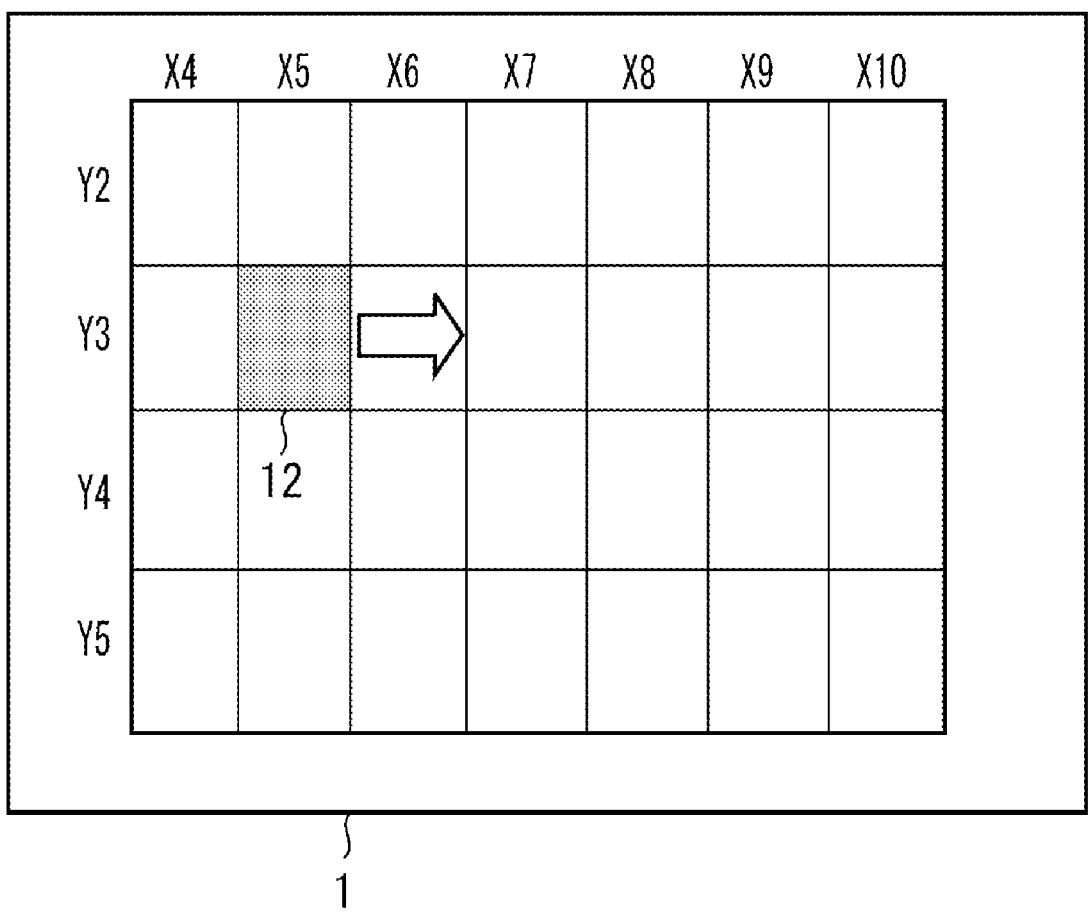
FIG. 6 illustrates an item and a cursor displayed in a display unit.

The display area is expanded in the moving direction of the cursor, that is, in the operation direction selected by the user, and the display area is moved in the cursor moving direction in step s106. For example, when the user long-presses the button of → for one second, the display area 11 is expanded to the right as illustrated in FIG. 5, the cursor 12 moves to the coordinate (X5, Y3) as illustrated in FIG. 6, and the item in a matrix state having a size of vertical 4×horizontal 7 is displayed.

Figure 7:
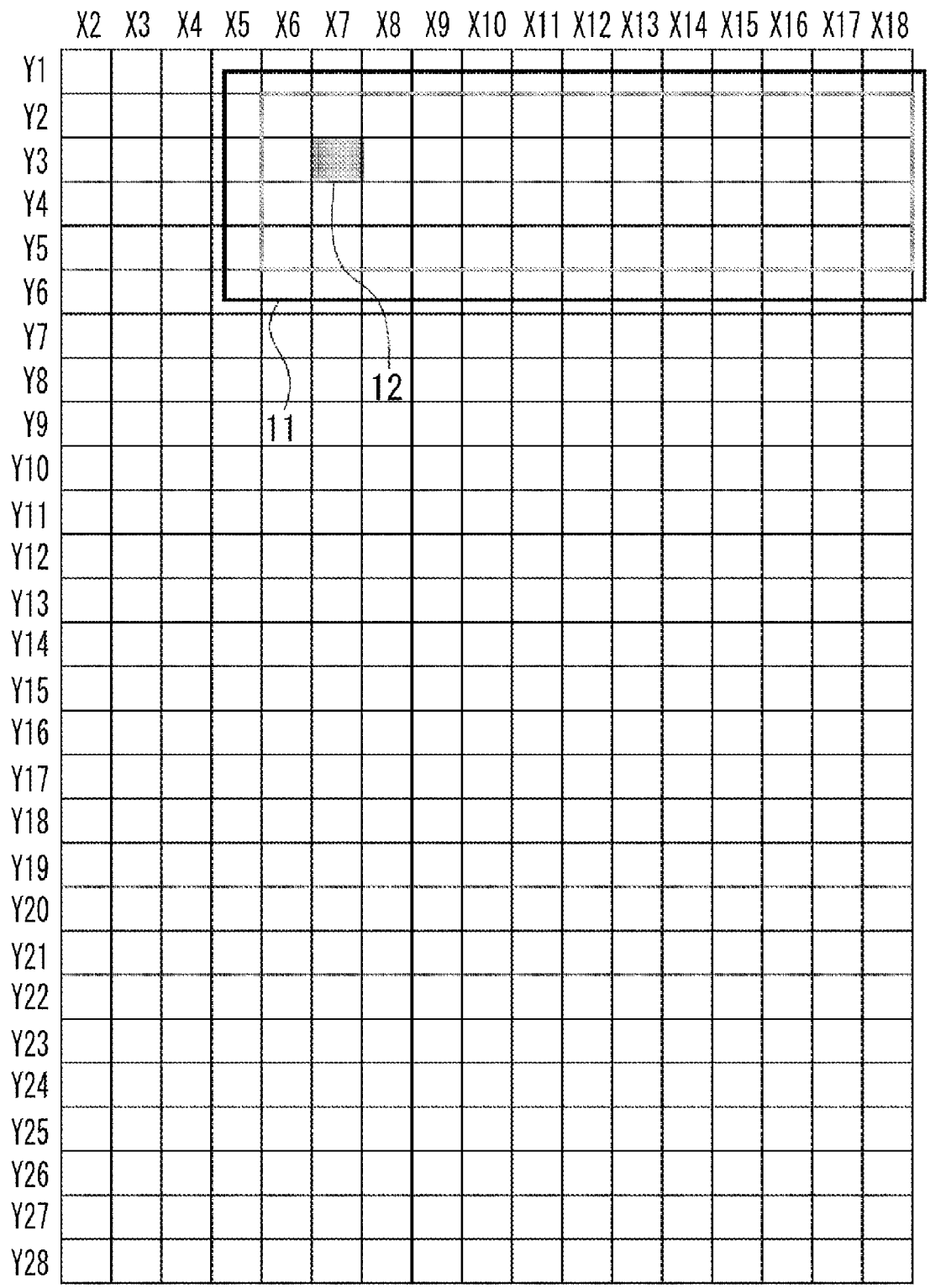
FIG. 7 illustrates a display area in an item space and a position of a cursor.
Figure 8:
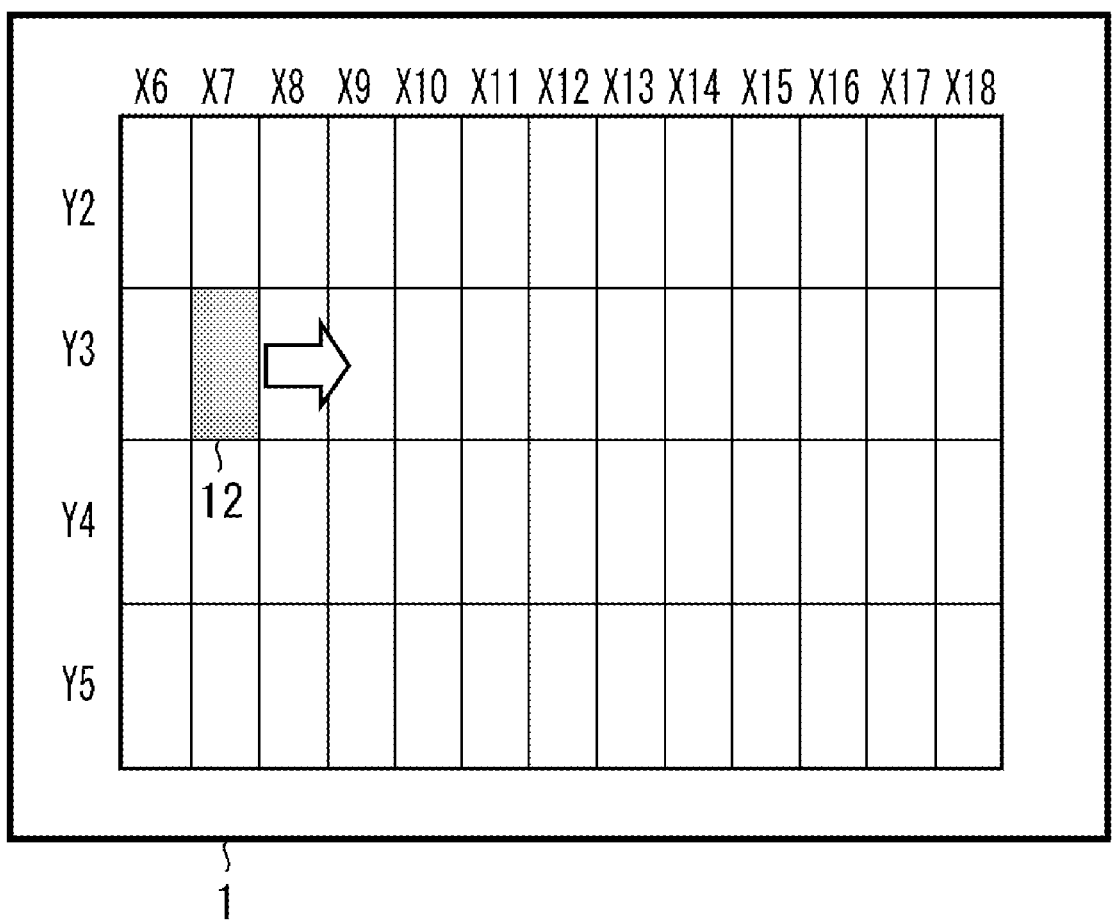
FIG. 8 illustrates an item and a cursor displayed in a display unit.
Figure 9:
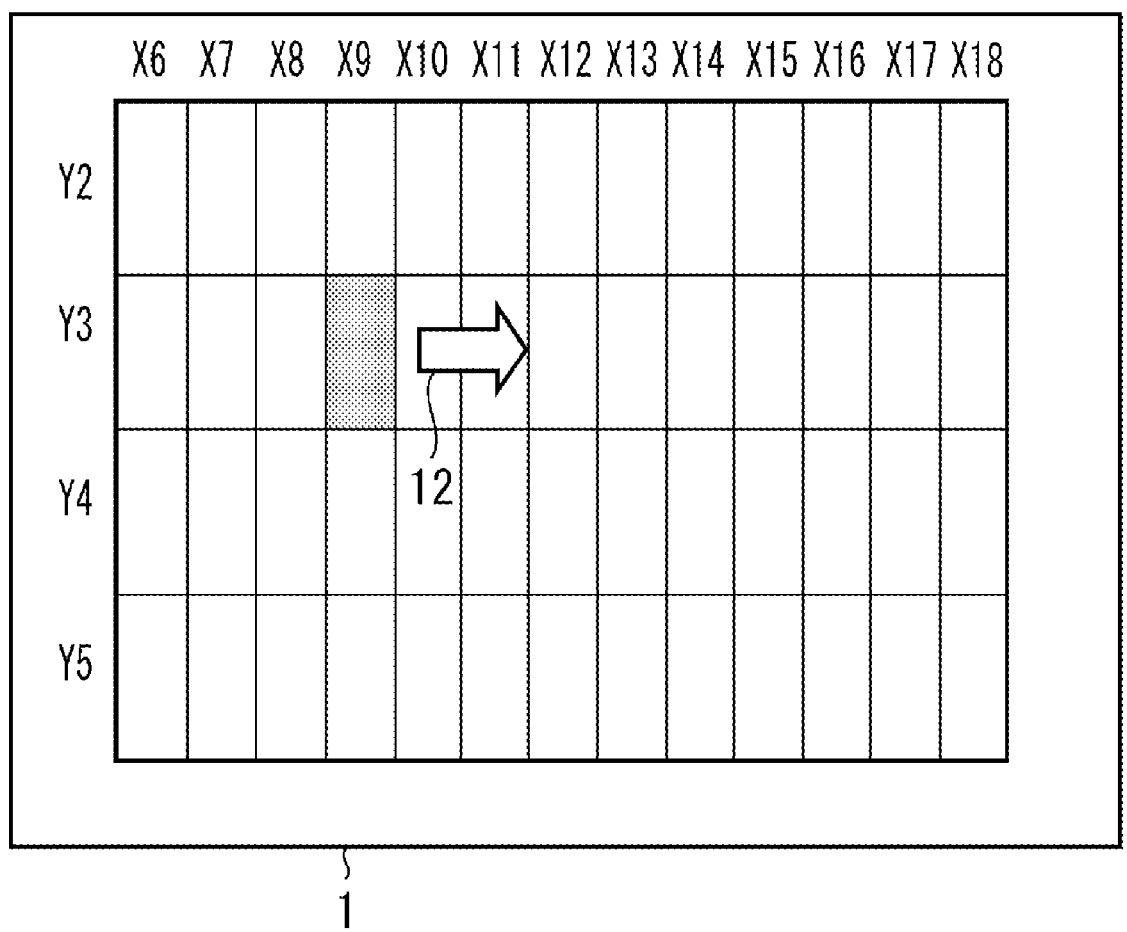
FIG. 9 illustrates an item and a cursor displayed in a display unit.
Figure 11:
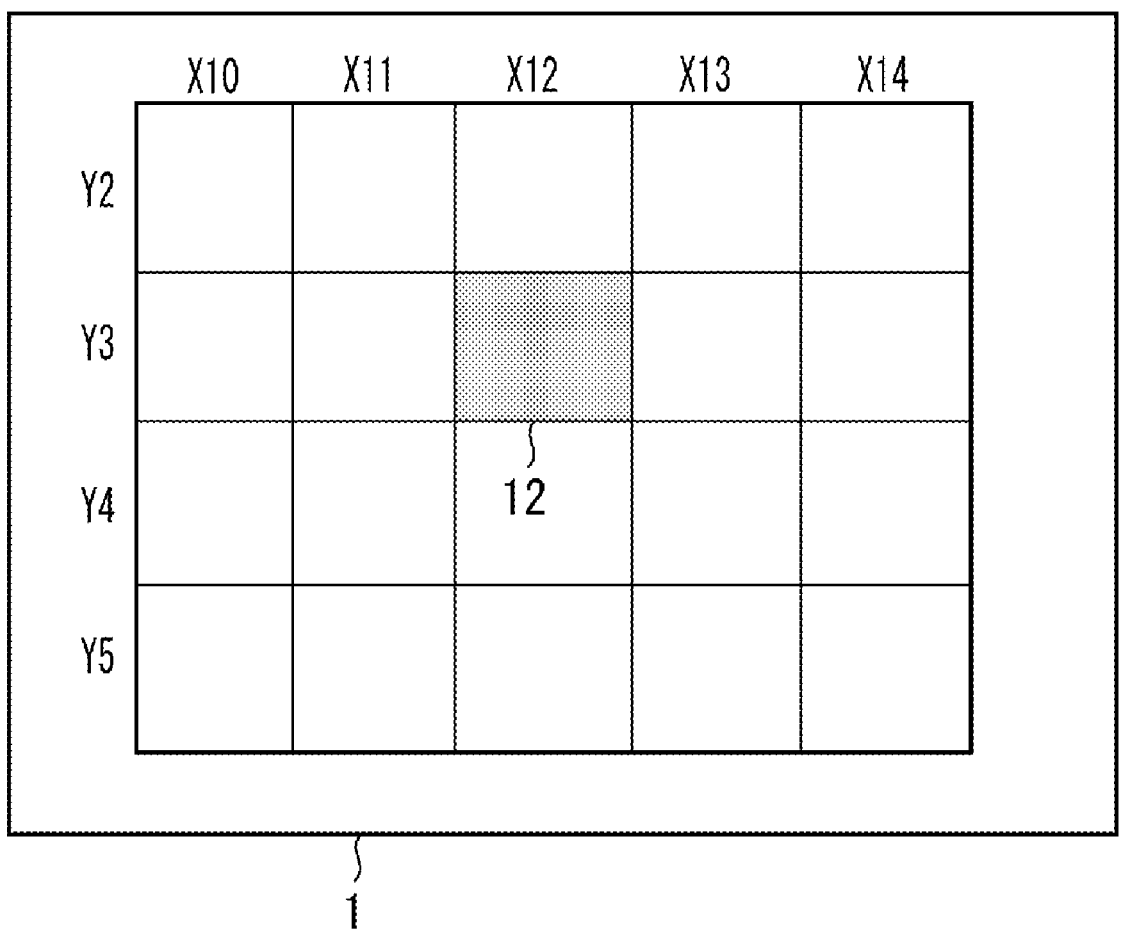
FIG. 11 illustrates an item and a cursor displayed in a display unit.

Further, when the user long-presses the button of → for two seconds, the display area 11 is expanded while moving to the right as illustrated in FIG. 7, the cursor 12 moves to the coordinate (X7, Y3) as illustrated in FIG. 8, and the item in a matrix state having the size of vertical 4×horizontal 13 is displayed. The display can be zoomed out, or can be scrolled. Now, the items in the horizontal direction are assumed to be up to X18. The user continuously presses the button of → in the state of FIG. 8 so as to move the cursor to the coordinate (X9, Y3). Further, the user continuously presses the button of → so as to move the cursor to the coordinate (X12, Y3). When the user stops long-pressing the button of →, the process proceeds to step S102, and an ordinary item having the size of vertical 4×horizontal 5 is displayed around the coordinate (X12, Y3) as illustrated in FIG. 11.

Figure 12:
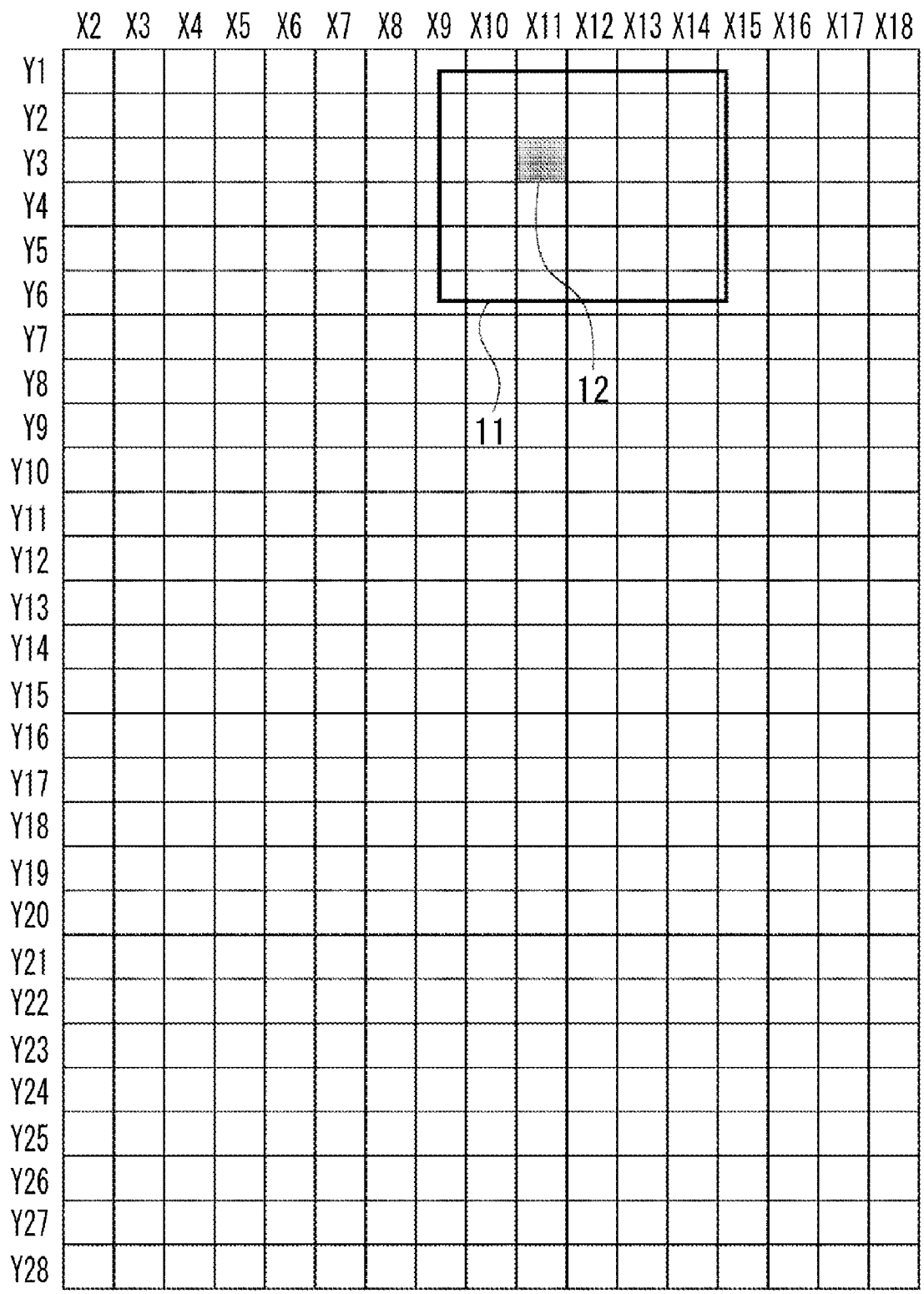
FIG. 12 illustrates a display area in an item space and a position of a cursor.
Figure 13:
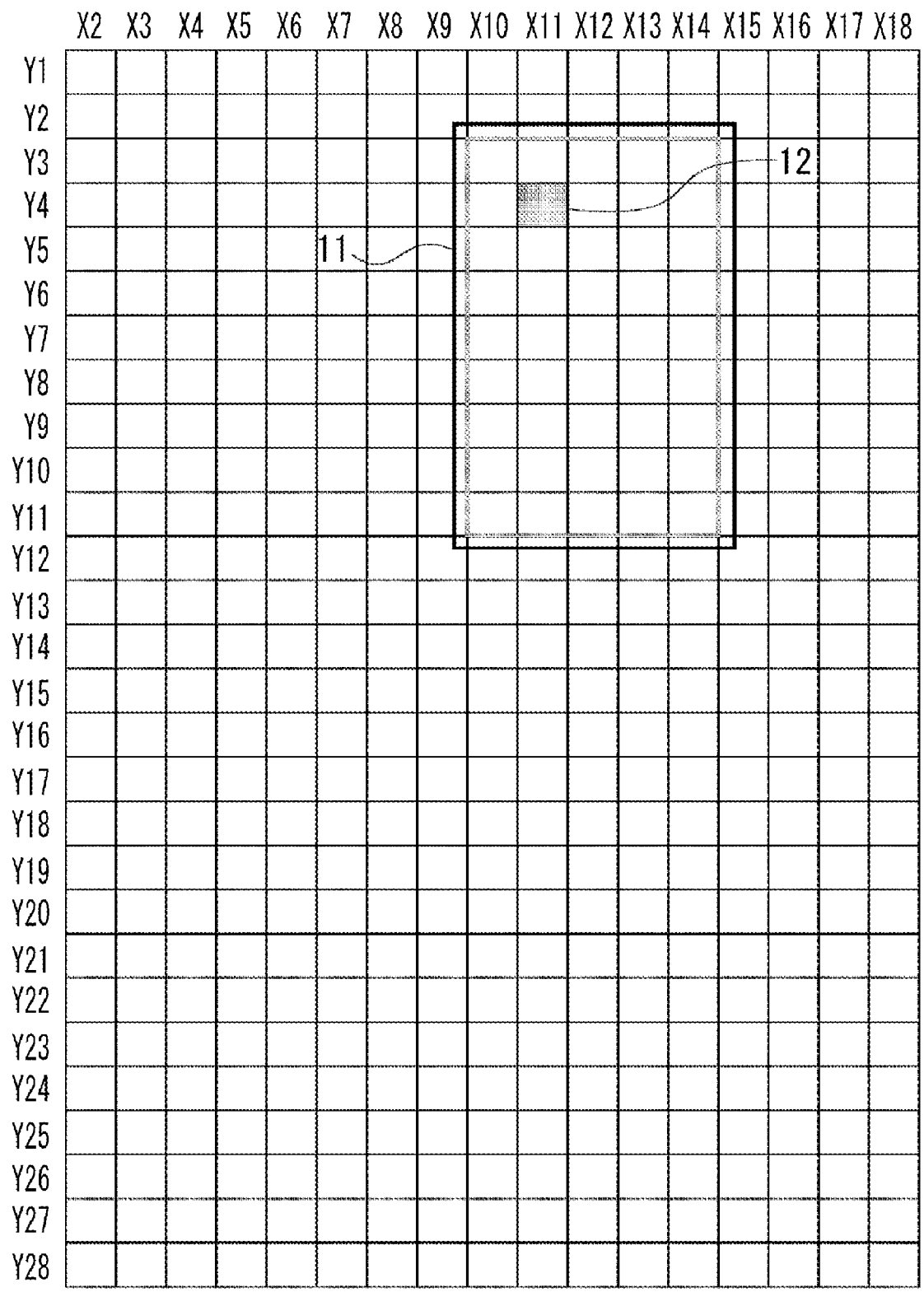
FIG. 13 illustrates a display area in an item space and a position of a cursor.

If the user short-presses the button of ←, the processing proceeds to step S107 via step S104, and the cursor moves ordinarily. In this case, the cursor moves to the coordinate (X11, Y3) on the adjacent left side. At this time, the display area 11 and the cursor 12 are in the state as illustrated in FIG. 12 within the item space of a matrix state.

Figure 14:
FIG. 14 illustrates an item and a cursor displayed in a display unit.

In this state, when the user long-presses the button of ↓, the display area 11 is expanded while downwardly moving, and the cursor 12 also moves to the coordinate (X11, Y4). At this time, the item and cursor displayed on the display unit 1 are in the state as illustrated in FIG. 14. An item can also be displayed and selected by the pushing-down pressure or the number of times of pressing ↑, ↓, ←, and → buttons instead of the pressing time of the buttons.

In the case of using the pushing-down pressure, a cursor move speed is changed according to the strength of the pushing-down pressure, and a display area moves. In the case of using the number of the pressing times, a cursor move speed is changed according to the pressing times, and a display area moves. Further, according to expanding or reducing of the displayed item, a text displayed in each item can be thinned, summarized, or displayed in more details. Further, in the case of reading the text in the item by voice synthesis, according to expanding or reducing of the displayed item, the text to be read can be thinned, summarized, or changed to a more detailed content. These rules are similarly applied to the following embodiments.

Thus, in the case of long-pressing the direction input button, when the pressing time becomes longer, the moving speed of a cursor in the direction selected by a user and the moving speed of a display area in the direction selected by the used become faster, and the display area in the direction selected by the user is expanded. As a result, more items in the direction selected by the user are displayed, and visibility in the direction selected by the user becomes better. On the other hand, when the direction input button is short-pressed, the cursor moves ordinarily in the direction selected by the user. In such a configuration, a user can roughly perform a search in the selected direction by long-pressing the cursor, and can perform detailed search around the cursor by short-pressing the cursor.

Figure 15:
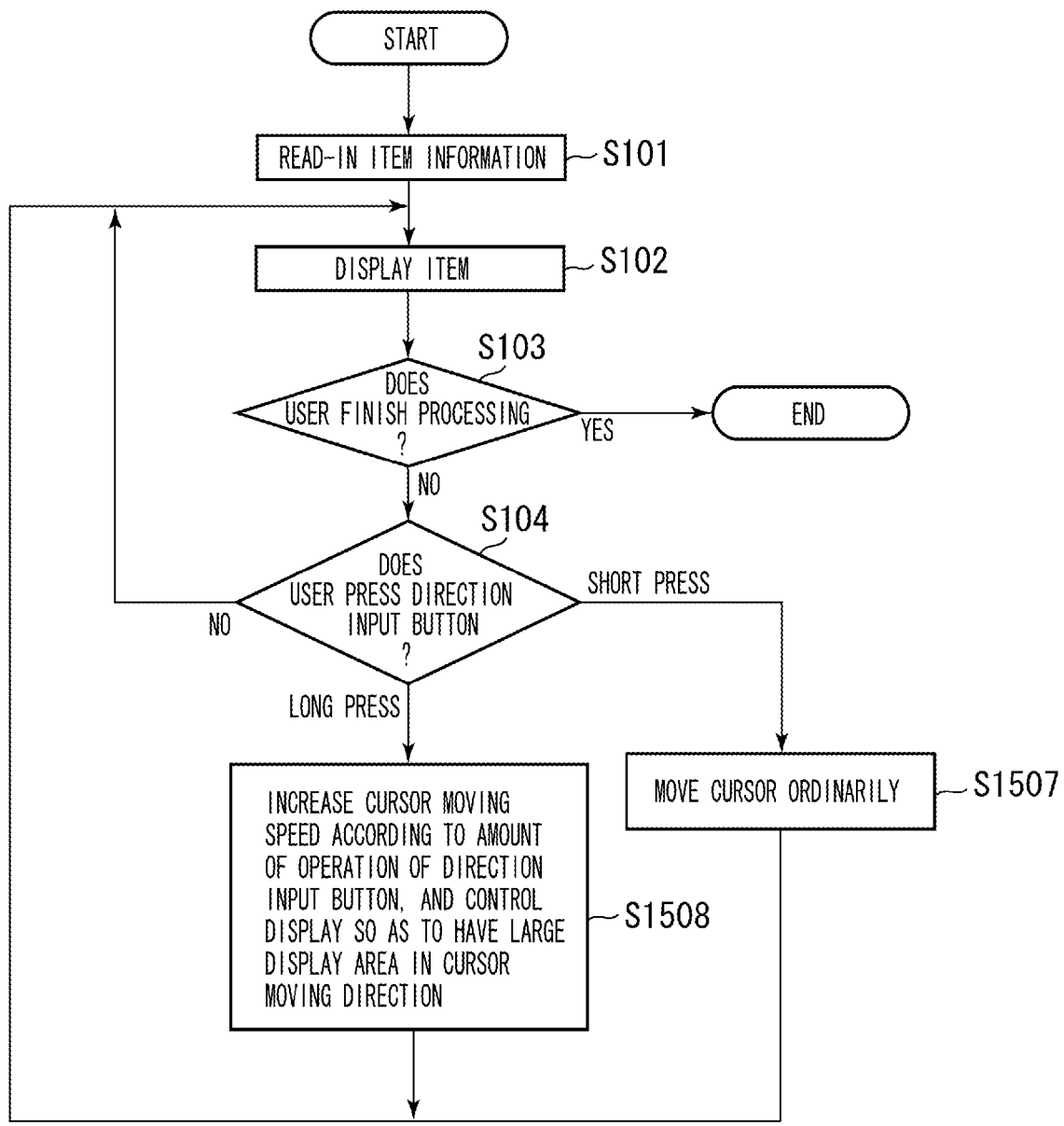
FIG. 15 is a flowchart illustrating a processing of a display selection device according to the second embodiment of the present invention.
Figure 16:
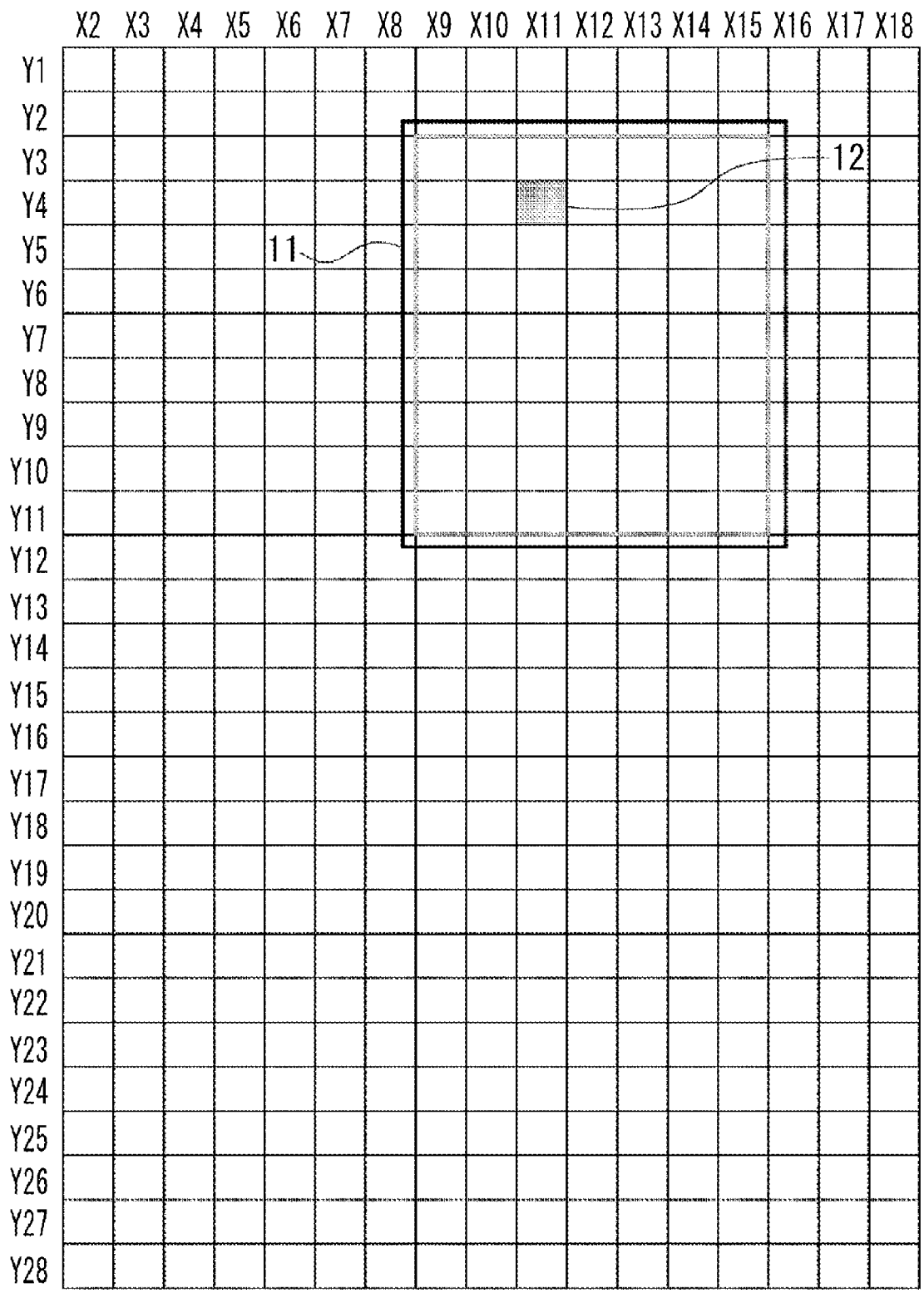
FIG. 16 illustrates a display area in an item space and a position of a cursor.

FIG. 15 is a flowchart carried out in a display selection device according to a second embodiment of the present invention. Steps similar to those in FIG. 2 are represented by the same symbols. For example, in the case where display area 11 is in the state illustrated in FIG. 12, if a user long-presses the ↓ button, the processing proceeds to step S1508 of FIG. 15. In step S1508, the moving speed of a cursor is downwardly increased in the matrix. The more the moving speed of a cursor, the more the display area 11 is expanded in the moving direction. Further, the more the moving speed of a cursor, the more the horizontal display area 11 of the cursor is expanded, and the horizontal display area 11 moves in the cursor move direction. Controlled in this way, the display area 11 and the cursor 12 are positioned as shown in the matrix of FIG. 16. If the user short-presses the ↓ button, the processing proceeds to step S1507, and the cursor moves ordinarily.

Thus, when the pressing time of the direction input button becomes longer, the moving speed of a cursor in the direction selected by a user becomes faster, the display area in the direction selected by the user is expanded, the horizontal display area of the cursor is expanded, and the moving speed of the display area in the direction selected by the user becomes faster. Thus, the horizontal display area of the cursor is expanded as the display area in the moving direction of the cursor is expanded. Accordingly, a user can vertically and horizontally look over a whole picture of the items well in balance. Further, many items are displayed in the direction selected by the user, so that visibility in the direction selected by the user becomes better.

Figure 17:
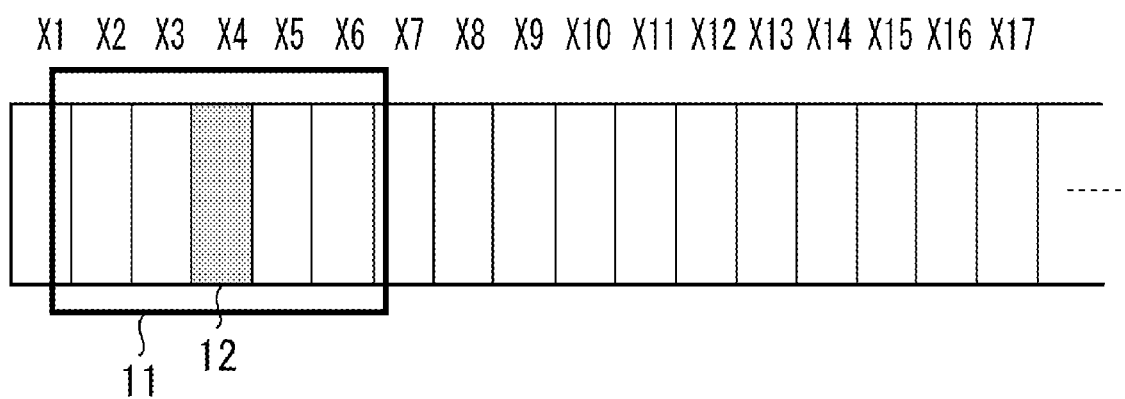
FIG. 17 illustrates a display area in an item space and a position of a cursor.
Figure 18:
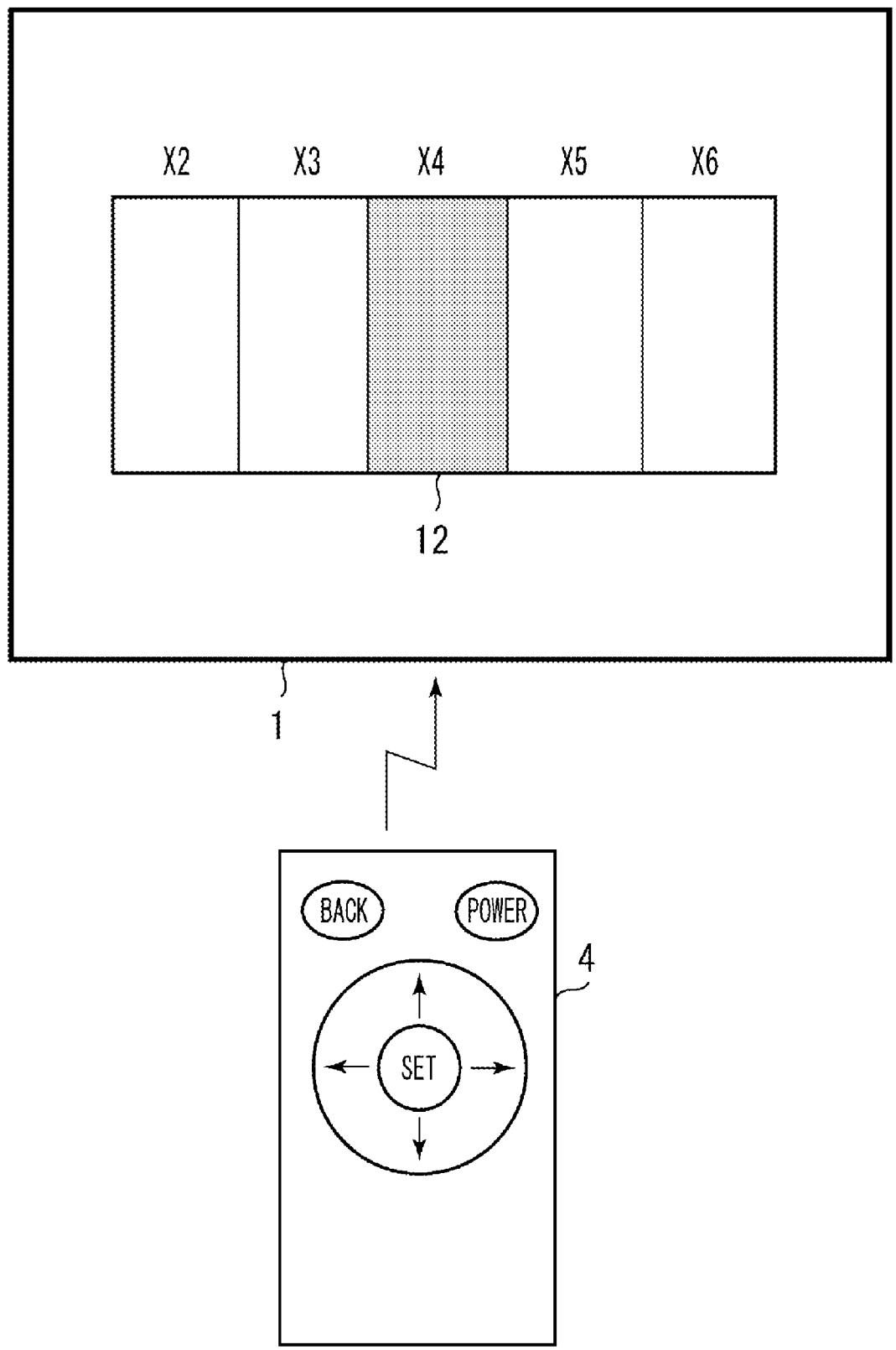
FIG. 18 illustrates an item and a cursor displayed in a display unit, and a remote controller of an operation unit.
Figure 19:
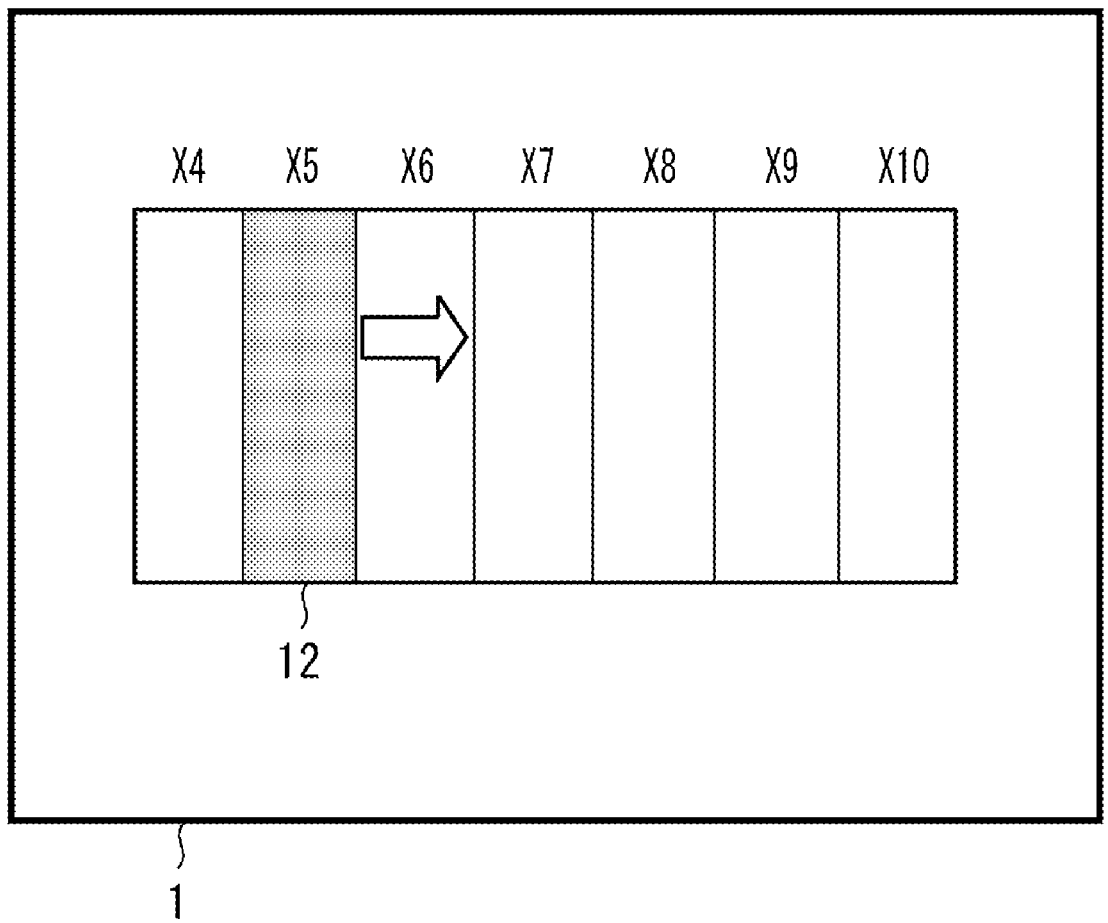
FIG. 19 illustrates an item and a cursor displayed in a display unit.

FIG. 17 illustrates a structure of items in a display selection device in a third embodiment of the present invention. In FIG. 17, the items are one-dimensionally arranged. A display area 11 and a cursor 12 are shown in FIG. 17. FIG. 18 illustrates a display unit 1 and an operation unit 1 according to FIG. 17. As illustrated in FIG. 18, the operation unit includes at least buttons of ← and →. When a user long-presses the button of →, the display unit 1 displays the cursor 12 (positioned at X5) and the items (positioned at X4 to X10) as illustrated in FIG. 19.

Figure 20:
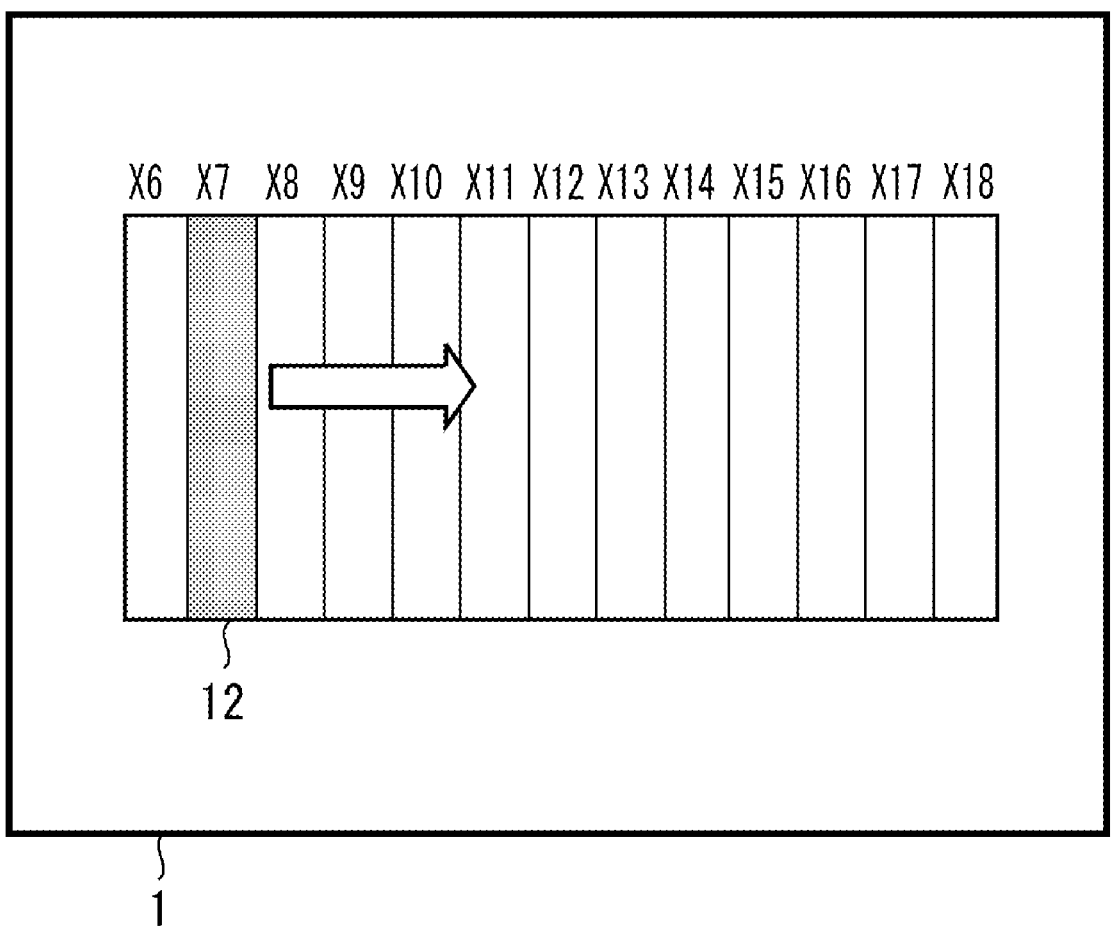
FIG. 20 illustrates an item and a cursor displayed in a display unit.

When a user long-presses the button of →, the display unit 1 displays the cursor 12 (positioned at X7) and the items (positioned at X6 to X8) as illustrated in FIG. 20. In this case, a clockwise or counterclockwise dial can be used instead of the buttons of ← and →. Any input devices capable of instructing at least two directions can be used. Further, as illustrated in FIGS. 19 and 20, when the moving speed of the cursor increases, an arrow displayed on a screen to show the cursor movement can be made longer or thicker, or the color of the arrow can be changed.

A map display device according to a fourth embodiment of the present invention will now be described. The map display device includes the same configuration as that in FIG. 1, except a storage unit 3 in the map display device that stores map information. In this embodiment, an operation unit 4 is a joy stick.

Figure 21:
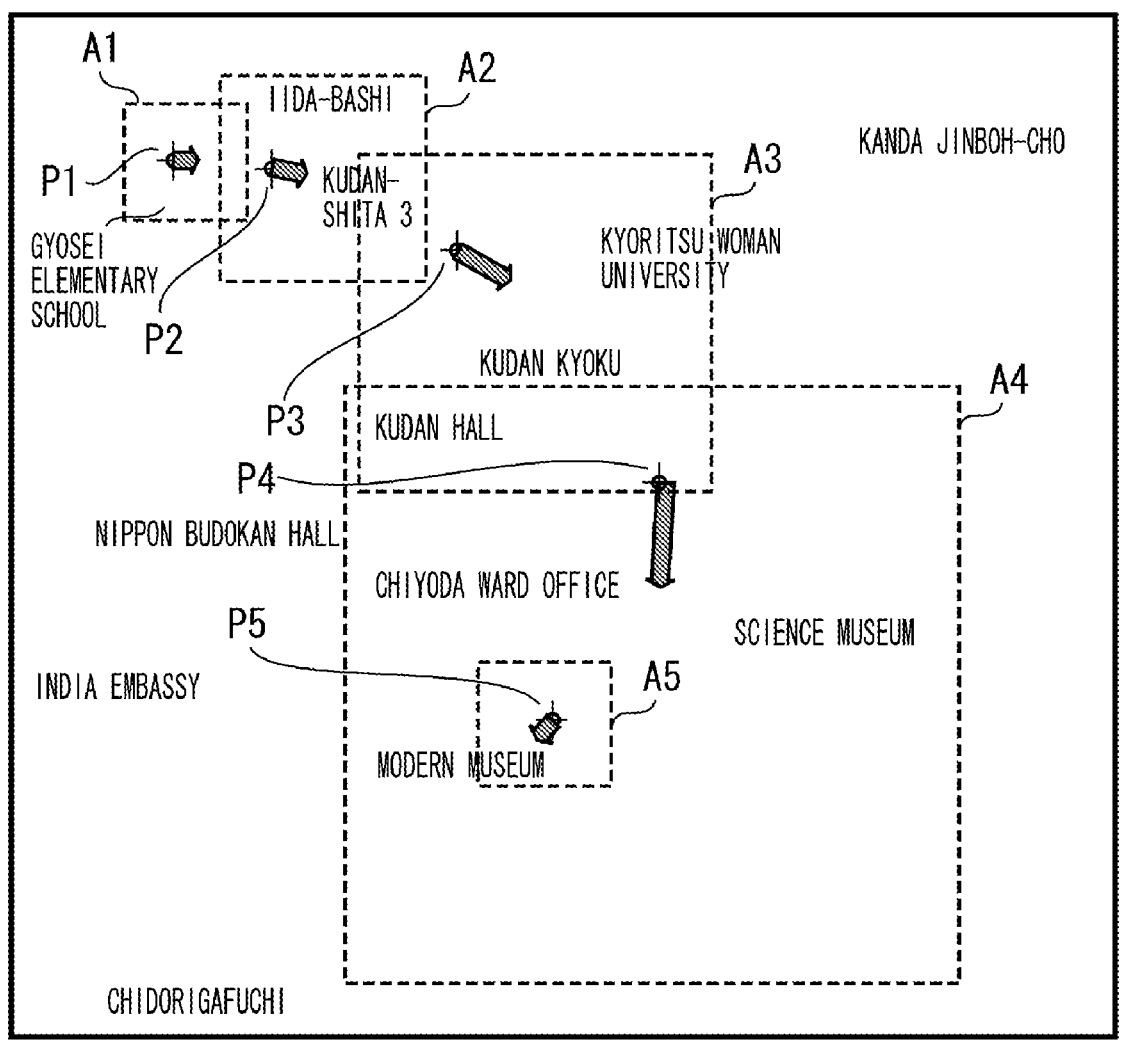
FIG. 21 illustrates an example of a map used in a map display device according to the forth embodiment of the present invention.
Figure 22:
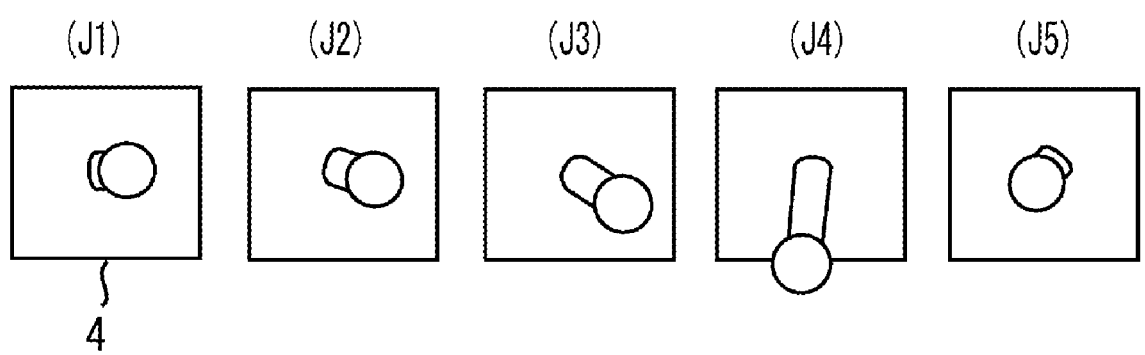
FIG. 22 illustrates a series of operations of a joy stick.

FIG. 21 illustrates an example of a map which is generated according to map information stored in the storage unit 3. A cursor moves from P1 to P5 in the map space in FIG. 21 according to operations (J1 to J5) of the joy stick illustrated in FIG. 22. When the joystick is slightly inclined to the right by the operation J1 in FIG. 22, a cursor moving speed vector is calculated and displayed as illustrated by V1 in FIG. 23 according to the inclining direction and angle of the joy stick.

When the joy stick is inclined by the operation J2, a cursor moving speed vector is calculated and displayed as illustrated by V2 in FIG. 24. The directions of the cursor moving speed vectors (V1 to V5) agree with the inclining direction of the joy stick, and the magnitudes of the cursor moving speed vector are in proportion to the inclining angle of the joy stick. The cursor smoothly moves in the map space according to the magnitude and direction of the cursor moving speed vector.

The display area A1 in FIG. 21 is calculated with respect to the cursor moving speed vector V1 in FIG. 23. When the cursor moving speed vector V1 increases, the display area A1 becomes larger and the area of the cursor P1 in the moving direction becomes wider in the display area A1. When a user smoothly performs an operation with respect to the inclining direction and angle of the joy stick as illustrated in the operations J1 to J5 in FIG. 22, the display area in the map space continuously and smoothly changes as illustrated by A1 to A5 in FIG. 21.

Generally, the cursor moving speed vector is set to V when a user operates a joy stick where a cursor is positioned at P. The maximum value of the cursor moving speed vector is set to C when a joy stick is inclined to the maximum. At this time, the display area is a square and a length R(V) of one side of this square is an increasing function of the cursor moving speed vector V, e.g. $R(V) \propto 2+2V$. Further, a center O of the square display area A is positioned $(1-(1-(V/C)^2)^{1/2}) \times R(V)/2$ apart from the cursor position P in the direction of the cursor moving speed vector V. Then, the ratio of the frontward display area in the cursor moving direction to the backward display area in the cursor moving direction becomes $(2-(1-(V/C)^2)^{1/2}):(1-(V/C)^2)^{1/2}$.

As a result, the more the cursor moving speed, the wider the frontward display area in the cursor moving direction. In this way, the cursor moving speed vector V1 in FIG. 23 and the display area A1 in FIG. 21 are obtained by the operation J1 in FIG. 21, and the map, cursor P1, and cursor moving speed vector V1 are displayed in the display area A1 of the display unit 1 as illustrated in FIG. 23. The cursor moving speed vector V2 in FIG. 24 and the display area A2 in FIG. 21 are obtained by the operation J2 in FIG. 22. The map, cursor P2, and cursor moving speed vector V2 are displayed in the display area A2 of the display unit 1 as illustrated in FIG. 24.

Thus, a user operates and moves a cursor using a joy stick to control a cursor moving speed vector, and the cursor position is obtained and displayed at any time by integrating the cursor moving speed vector. When a cursor moving speed increases, a display area on a map and the frontward display area in the cursor moving direction become larger. As a result, a desired point on the map can be searched by an easy operation.

In the map display device according to the fourth embodiment, the display area A can be determined as follows: the cursor moving speed vector is set to V when a user operates a joy stick where a cursor is positioned at P. The maximum value of the cursor moving speed vector is set to C when a joy stick is inclined to the maximum. At this time, the display area is a square and a length R(V) of one side of this square is an increasing function of the cursor moving speed vector V, e.g. R(V)∝2+2V.

A center O of the square display area A is positioned (V/C)×R(V)/2 apart from the cursor position P in the direction of the cursor moving speed vector V. Then, the ratio of the frontward display area in the cursor moving direction to the backward display area in the cursor moving direction becomes (1+V/C):(1−V/C). Thus, the more the cursor moving speed, the wider the frontward display area in the cursor moving direction.

In a car navigation system, a cursor is fixed at a screen center, and map information is scrolled while the cursor is fixed. When the present invention is applied to such a device, for example, map information is at first scrolled in the right direction and then, the information is scrolled while a cursor is fixed at a screen center. When an operation amount is more than a predetermined value, a cursor moves in the opposite direction, that is, in the left direction. In such a configuration, a user can feel that the display area in the right direction becomes larger, and visibility in the direction selected by the user can be improved.

Functions of the embodiments of the present invention can be realized as a storage medium recording a program code of software, where the program code is supplied to a system or apparatus. Then, a computer (or CPU and MPU) of the system or apparatus reads out the program code stored in the storage medium and executes it. In this case, the program code itself realizes the functions of the above-described embodiments, and the storage medium storing the program code is a part of the present invention.

For example, the storage medium for supplying the program code is a floppy disk, a hard disk, an optical disk, a magneto-optical disk, CD-ROM, CD-R, a magnetic tape, a nonvolatile memory card, ROM, or the like.

Further, the above-described embodiments according to the present invention are not limited to the functions in which a computer reads out and executes a program code to realize the functions. For example, an OS (operating system) working on a computer performs a part or whole of the processing based on the instruction of the program code so that the functions of the above-described embodiments can be realized.

Further, a program code read-out from a storage medium is written in a memory of a function expansion board inserted into a computer or a function expansion unit connected with a computer. Then, a CPU or the like of the function expansion board or function expansion unit performs a part or whole of the processing so that the functions of the above-described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-167431 filed Jun. 16, 2006, which is hereby incorporated by reference herein in its entirety.

What is claimed is:

1. An information processing apparatus comprising:
  a first display control unit configured to display a first area corresponding to at least part of an image on a display screen;
  a first detection unit configured to detect, as an operation direction of a direction inputting operation, a first operation direction and a second operation direction perpendicular to the first operation direction;
  a second detection unit configured to detect an operation amount of a direction inputting operation; and
  a second display control unit configured to, in a case where the first detection unit detects the first operation direction and does not detect the second operation direction, display on the display screen a second area where a length of the second operation direction of the first area is not changed and a length of the first operation direction of the first area is lengthened based on the operation amount of the direction inputting operation.

2. The information processing apparatus according to claim 1, wherein the direction inputting operation is pressing of at least one button, and wherein the operation amount is an amount of time the at least one button is pressed, the amount of pressure applied when the at least one button is pressed, or a number of times the at least one button is pressed.

3. The information processing apparatus according to claim 1, wherein the direction inputting operation is movement of a joy stick, and wherein the operation amount is the amount of time the joy stick is inclined, the amount of pressure applied when inclining the joy stick, or the number of times the joy stick is inclined.

4. A method for processing information, the method comprising:
  displaying a first area corresponding to at least part of an image on a display screen;
  detecting, as an operation direction of a direction inputting operation, a first operation direction and a second operation direction perpendicular to the first operation direction;
  detecting an operation amount of a direction inputting operation; and
  controlling display of information, in a case where detecting the first operation direction and not detecting the second operation direction, display on the display screen a second area where a length of the second operation direction of the first area is not changed and a length of the first operation direction of the first area is lengthened based on the operation amount of the direction inputting operation.

5. A computer-readable storage medium storing computer-executable process steps, the computer-executable process steps causing a computer to execute a method of comprising:
  displaying a first area corresponding to at least part of an image on a display screen;
  detecting, as an operation direction of a direction inputting operation, a first operation direction and a second operation direction perpendicular to the first operation direction;
  detecting an operation amount of a direction inputting operation; and
  displaying, in a case where the first detection unit detects the first operation direction and does not detect the second operation direction, display on the display screen a second area where a length of the second operation direction of the first area is not changed and a length of the first operation direction of the first area is lengthened based on the operation amount of the direction inputting operation.

* * * * *